Nov. 5, 1968  A. E. HARRIS  3,408,665
CORNER BRACKET FOR BED RAILS
Filed June 24, 1966
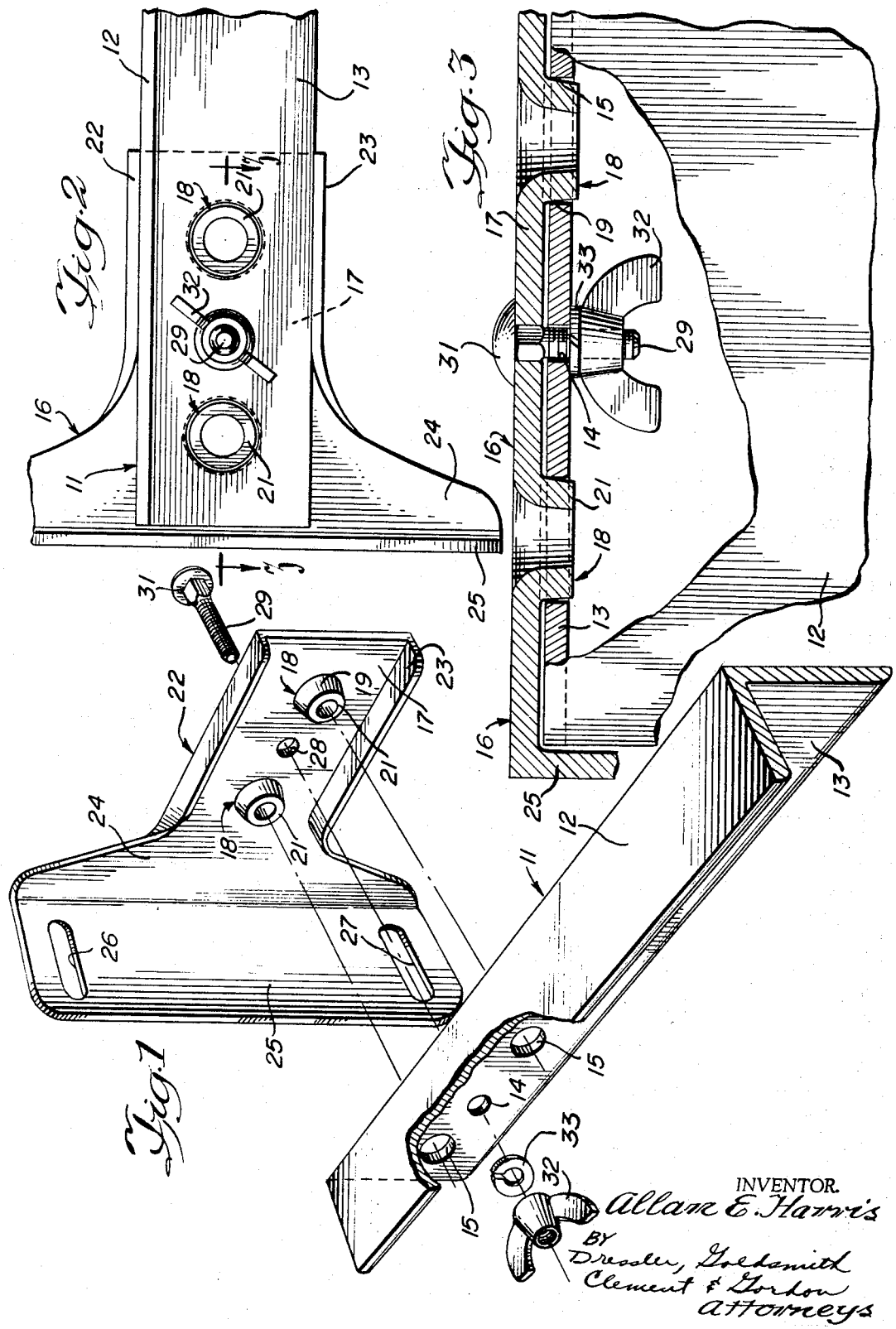
INVENTOR.
Allan E. Harris
BY Dressler, Goldsmith
Clement & Gordon
Attorneys

United States Patent Office 3,408,665
Patented Nov. 5, 1968

3,408,665
CORNER BRACKET FOR BED RAILS
Allan E. Harris, Winnetka, Ill., assignor to Harris-Hub Company, Inc., a corporation of Illinois
Filed June 24, 1966, Ser. No. 560,206
2 Claims. (Cl. 5—304)

ABSTRACT OF THE DISCLOSURE

A corner bracket for bed rails is provided with a pair of projections spaced the same as two apertures in a bed rail. Each projection has its outer surface tapered to make one end fit easily into one of the apertures and has a base portion of larger diameter than said aperture. The bracket also has an aperture that is aligned axially with a third aperture in the bed rail by the interengagement of the tapered surfaces of the projections with the edges of the rail defining the first mentioned apertures as a nut is tightened on a bolt projecting through the aperture in the bracket and the third aperture in the bed rail.

---

This invention relates to a corner bracket for bed rails, and is particularly concerned with means facilitating the securement of a corner bracket to one end of a bed rail.

It has been customary heretofore to rivet each corner bracket to one of the longitudinal bed rails that support the springs of the bed. Because of the load to which the brackets may be subjected, two or more rivets are used on each bracket. The apertures through which the rivets are passed must be aligned with reasonable accuracy in order to permit the application of each rivet. The alignment is often difficult because of variances in the spacing between the apertures in the bracket and the apertures in the bed rail.

Corner brackets constructed in accordance with the present invention are easily positioned relative to the bed rail and are each wedged into place by the action of a single bolt extending through aligned apertures in the bracket and bed rail and threaded into a nut. The bracket is provided with projections each having a free end dimensioned to fit easily into an aperture in the bed rail. The projections are tapered and the free ends thereof are smaller in diameter than the apertures into which they extend.

The difference between the diameter of each of the apertures and the free end of each projection permits the free end of each projection to enter the aperture of the bed rail, even if there is a variance between the spacing of the apertures and the spacing between the projections. When the free ends of the projections are located within the apertures of the bed rail, the tightening action of the nut on the bolt extending through the aligned apertures of the rail and bracket wedges each projection into its aperture. The tapered surface of each projection is forced into binding engagement with an edge portion of the rail defining the aperture engaged thereby, and thus prevents any relative movement between the bracket and the bed rail.

A suitable structure by means of which the above mentioned advantages are attained will be fully described in the following specification, taken in conjunction with the accompanying drawings, in which:

FIGURE 1 is an exploded perspective view of a corner bracket, an end portion of a bed rail, and means for securing the bracket to the rail;

FIGURE 2 is a fragmentary side elevational view showing the bracket secured to the rail; and FIGURE 3 is an enlarged view, partly in elevation, and partly in cross section taken in the plane represented by the line 3—3 of FIGURE 2.

In the drawings, a bed rail 11, comprising a horizontal flange 12 and a vertical flange 13, is provided with an aperture 14 and two larger apertures 15 extending through the vertical flange near one end of the rail. The apertures 15 are preferably spaced on opposite sides of the aperture 14, but may be located anywhere near the end of the rail, provide they are spaced longitudinally of the rail.

A corner bracket 16 comprises a plate 17 having projections 18 extending from one surface thereof. The outside diameter of each projection adjacent the surface of the plate 17 is greater than the diameter of the aperture 15 into which it is adapted to fit. The outer surface of each projection 18 is tapered, as indicated at 19, so that the outside diameter at its free end 21 is smaller than the diameter of the apertures 15.

The portion of the plate 17 from which the projections 18 extend has an upper flange 22 and a parallel lower flange 23 extending along the longitudinal edges thereof. When the plate 17 is pressed against the bed rail with the projections 18 extending into the apertures 15, the flange 22 engages the top surface of the horizontal flange 12, and the flange 23 engages the lower edge of the vertical flange 13. The spacing of the flanges 22 and 23 helps to locate the bracket 16 vertically relative to the bed rail.

The flanges 22 and 23 are shorter in length than the bracket 16 and terminate intermediate the length of the bracket. The width of the plate 17 is increased beyond the ends of the flanges 22 and 23, as indicated at 24. The wide portion 24 of the bracket is bent at right angles to provide an end plate 25 having a height considerably greater than the height of the vertical flange 13 of the bed rail. The end plate 25 has apertures 26 and 27 adapted to receive fastening members (not shown) by means of which the bracket is secured to either the head or foot board of a bed. The end plate 25 is positioned close to the end of the bed rail, and the close relationship of the end plate to the end of the bed rail serves to help locate the bracket 16 in the proper longitudinal relationship to the rail.

When the bracket 16 is properly located relative to the bed rail, the projections 18 are axially aligned with the apertures 15, and their free ends easily fit into the apertures. The plate is pressed toward the bed rail until the tapered outer surface 19 of each projection engages the edge of the rail defining the aperture in which the projection is positioned. The plate 17 is provided with an aperture 28, and the interengagement of the projections 18 and apertures 15 causes the apertures 28 to be axially aligned with the aperture 14 of the bed rail. A bolt 29 is then passed through the apertures 28 and 14. The bolt has an enlarged head 31 that abuts against the surface of the plate 17 remote from the flange 13. A wing nut 32 is threaded on the end of the bolt that extends through the aperture 14. A washer 33 is positioned on the bolt 29 between the flange 13 and the nut 32. The nut 32 is tightened against the washer 33 to draw the bracket closer to the bed rail. When the nut 32 is tightened as much as possible, the wedging action of the tapered surfaces 19 of the projections 18 binds the projections tightly against the edges of the rail defining the apertures 15 and prevents any looseness in the connection between the bracket and the rail. The engagement of the projections 18 in the apertures 15 holds the bracket rigidly against the rail, even though the plate 17 is not in surface-to-surface engagement with the flange 13.

Although a preferred embodiment of the invention has been described in considerable detail, it will be understood that the description thereof is intended to be illustrative, rather than restrictive, as many details of construction may be modified or changed without departing from the spirit or scope of the invention. Accordingly, it is not desired to be restricted to the exact details of structure described.

What is claimed is:

1. A corner bracket for a bed rail having a flange provided with a pair of longitudinally spaced apertures adjacent one end thereof, said bracket comprising a plate adapted to be positioned parallel to said flange and having means along its longitudinal edges engaging the upper and lower surfaces of said flange, a pair of projections extending from one side of said plate in approximately the same spatial relationship as said apertures, each of said projections having a substantially conical outer surface tapering from a base having a larger diameter than said aperture to a free end of smaller diameter than the diameter of the aperture into which it extends, and the diameter of said base being sized sufficiently larger than the diameter of said aperture to permanently preclude surface-to-surface engagement of said one side of said plate and said flange upon tightening or retightening of said nut, the difference between the diameter of each of said apertures and the free end of the projection extending therethrough permitting entry of each of said projections into one of said apertures, said plate and said flange being provided with apertures that are aligned axially by the interengagement of said projections and said first mentioned apertures, a bolt extending through said axially aligned apertures, and a nut threaded on said bolt, said nut being tightened on said bolt to secure said bracket and bed rail together, whereby said projection become wedged into tight binding engagement with the edge portions of said rail defining said first mentioned apertures and relative movement therebetween is prevented.

2. The structure recited in claim 1 in which said plate has parallel flanges along its longitudinal edges, said parallel flanges being adapted to fit adjacent the upper and lower surfaces of said first mentioned flange to facilitate positioning said bracket relative to said bed rail.

References Cited

UNITED STATES PATENTS

| | | | |
|---|---|---|---|
| 1,120,413 | 12/1914 | Rosenberg | 5—290 |
| 1,337,150 | 4/1920 | Okun | 5—290 |
| 1,467,606 | 9/1923 | Cobb | 5—290 |
| 1,518,100 | 12/1924 | Nighbert. | |
| 2,257,314 | 9/1941 | Shinn | 30—169 XR |

CARL W. TOMLIN, *Primary Examiner.*

A. KUNDRAT, *Assistant Examiner.*